(12) United States Patent
Matsumoto et al.

(10) Patent No.: US 7,513,699 B2
(45) Date of Patent: Apr. 7, 2009

(54) FIBER OPTIC RECEPTACLE AND OPTICAL MODULE

(75) Inventors: Toshiyuki Matsumoto, Kitami (JP); Katushi Tamaki, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/609,795

(22) Filed: Dec. 12, 2006

(65) Prior Publication Data

US 2007/0183723 A1  Aug. 9, 2007

(30) Foreign Application Priority Data

Dec. 14, 2005  (JP) ............ P 2005-360843

(51) Int. Cl.
*G02B 6/36* (2006.01)
(52) U.S. Cl. ............... 385/92; 385/53; 385/88
(58) Field of Classification Search ............ 385/53, 385/88, 92
See application file for complete search history.

(56) References Cited

FOREIGN PATENT DOCUMENTS

| JP | 2004-287198 | 10/2004 |
|----|-------------|---------|
| JP | 2005-099748 | 4/2005  |

*Primary Examiner*—Jennifer Doan
(74) *Attorney, Agent, or Firm*—Hogan & Hartson LLP

(57) ABSTRACT

A fiber optic receptacle which can be assembled with high precision and which has high reliability and is low-priced is provided. The receptacle includes a tubular shaped sleeve having an inner bore into which a ferrule is to be inserted; and a stopper member having a distal end face to be contacted to one end of the ferrule and a rear end face. The stopper member is in the inner bore of the sleeve with the distal and the rear end faces apart from both ends of the inner bore. The inner bore of the sleeve has a contact area contacting with the stopper member and non-contact area not contacting with the stopper member. The non-contact area is on both sides of the contact area, and a diameter of the inner bore in the contact area is larger than that in the non-contact area.

15 Claims, 6 Drawing Sheets

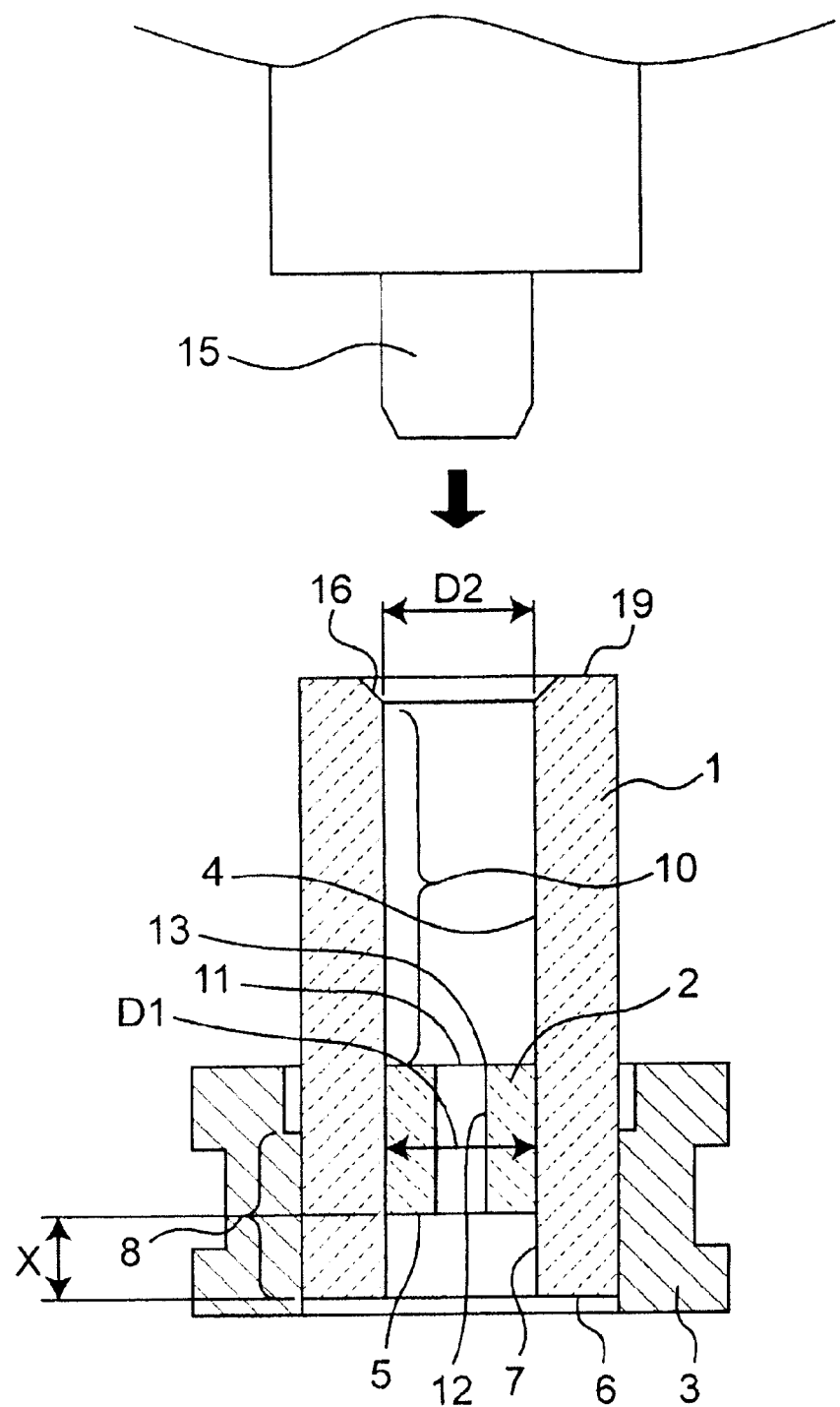

FIBER OPTIC RECEPTACLE AND OPTICAL MODULE

TECHNICAL FIELD

The present invention relates a receptacle used in optical communication modules or the like.

BACKGROUND ART

In recent years, as larger amount of information is transmitted at higher speed with larger transmission capacity over telecommunications networks, optical communication technologies have been increasingly employed to meet the needs. In the optical communication, an electrical signal is converted into an optical signal which is transmitted over an optical fiber and, at the receiving end, the optical signal is converted back to the electrical signal. Conversion between the electrical signal and the optical signal is carried out by an optical device such as semiconductor laser or photo diode, while a fiber optic receptacle is used to establish the coupling between the optical device and the optical fiber.

For the fiber optic receptacle, various typos are used depending on the application, such as one that has a fiber stub which holds the optical fiber, or one that employs a hollow stopper, while optical communication modules operating at relatively low transmission speeds in a range from 155 Mbps to 1 Gbps employ fiber optic receptacle that uses a hollow stopper. For example, Japanese Unexamined Patent Publication (Kokai) No. 2005-99748 discloses fiber optic receptacle having a fiber stub inserted into the bore of a sleeve and is fixed therein with an adhesive. In the fiber optic receptacle disclosed in this publication, a ferrule provided on the side of an optical connector is inserted into the bore of the sleeve and is put into contact with one end of the fiber stub.

Japanese Unexamined Patent Publication (Kokai) No. 2004-287198 and Japanese Unexamined Patent Publication (Kokai) No. 6-40903 disclose fiber optic receptacles for low-speed optical modules. FIG. 6 shows a fiber optic receptacle having the structure disclosed in Japanese Unexamined Patent Publication (Kokai) No. 2004-287198, where a ferrule 15 of the optical connector makes contact with a stopper surface 17. Japanese Unexamined Patent Publication (Kokai) No. 6-40903 discloses such a structure as a stopper which makes contact with the distal end of a ferrule is made of ceramics.

The fiber optic receptacle disclosed in Japanese Unexamined Patent Publication (Kokai) No. 2005-99748 has such a problem that, since the fiber stub is inserted into the bore of the sleeve and is fixed therein with an adhesive, the adhesive must be applied evenly so as to prevent the fiber stub from being eccentrically located, thus making an obstacle to the reduction of manufacturing cost.

The fiber optic receptacle disclosed in Japanese Unexamined Patent Publication (Kokai) No. 2004-287198 has such problems that, since the stopper surface 17 which makes contact with the ferrule 15 of the optical connector is made of a metal, there are problems of durability of the ferrule 15 against repetitive impact and difficulty in inserting the ferrule 15 due to deposition of dirt formed from wearing of the stopper surface 17 onto the inner circumference 19 of the sleeve 1. In the case of the sleeve of a receptacle used in single mode operation, in particular, where the clearance between the inner circumference of the sleeve and the outer circumference of the formula of the optical connector is about 1 to 2 μm, even a small amount of wear dust deposited on the inner circumference may make it impossible to insert or pull out the ferrule of the optical connector.

Furthermore, ill the fiber optic receptacle disclosed in Japanese Unexamined Utility Model Publication (Kokai) No. 6-40903 where the stopper is made of ceramics, there is a problem that the manufacturing cost cannot be reduced as the number of component parts increases or it is necessary to polish the inner circumference of the sleeve and/or control the accuracy after assembling the sleeve.

Accordingly, an object of the present invention is to provide a fiber optic receptacle which can be assembled with high precision, has high reliability and is low-priced.

DISCLOSURE OF THE INVENTION

In the fiber optic receptacle having the constitution of the present invention, since the sleeve is made in such a structure as the inner diameter of the sleeve is larger in a portion which does not make contact than in a portion which makes contact with the outer circumference of the stopper member, the stopper can be held with a sufficient retaining foray in resistance to a force applied when inserting the ferrule to the optical connector.

The fiber optic receptacle having the constitution of the present invention can be manufactured in a simplified process with a lower manufacturing cost, since the stopper can be held with high accuracy by pressing the stopper, having a diameter larger than the inner diameter of the sleeve, to fit in the bore of the sleeve.

Therefore, since the present invention makes it possible to secure all component parts without using adhesive or the like, the fiber optic receptacle which can be assembled with high precision and has high reliability can be supplied at a low cost.

BRIEF DESCRIPTION OF THE DRAWINGS

FIG. 1A is a sectional view showing a fiber optic receptacle according to a first embodiment of the present invention.

FIG. 5B is an enlarged partial sectional view showing a part of the sectional view of FIG. 5A.

BEST MODE FOR CARRYING OUT THE INVENTION

Figure 1B:
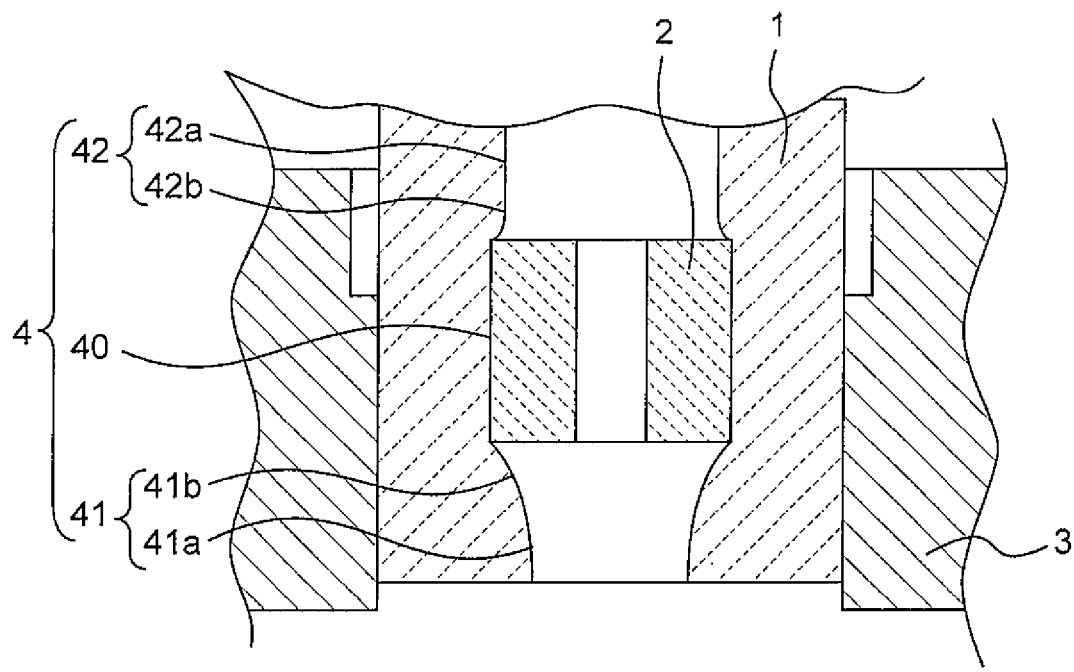
FIG. 1B is an enlarged sectional view showing a part of the fiber optic receptacle according to the first embodiment.

The fiber optic receptacle of the present invention, comprising a sleeve 1, a stopper 2 and a sleeve holder 3 as shown in FIG. 1A, is a component constituting a part of an optical connector and an optical module and receives an optical fiber, which is held by a plug ferrule 15 in combination with a plug, optically connected thereto.

The fiber optic receptacle of the present invention is characterized in that the diameter of the bore on one end of the sleeve 1 is smaller than the outer diameter of the stopper 2 which is inserted into the bore, so that effect to be described later is achieved.

The fiber optic receptacle according to the embodiments of the present invention and an optical module that employs the fiber optic receptacle will now be described with reference to the accompanying drawings.

First Embodiment

FIG. 1A is a sectional view showing the fiber optic receptacle according to the first embodiment of the present invention.

The fiber optic receptacle according to the first embodiment comprises a sleeve 1 having tubular shape with the bore thereof receiving a plug ferrule 15, which holds an optical fiber inside thereof, inserted therein, a stopper 2 which is disposed in the bore 4 of the sleeve 1 and makes contact at the distal end face 11 thereof with one end of the plug ferrule 15 and a holder 3 having a sleeve receiving bore, wherein the sleeve 1 is pressed to fit in the sleeve receiving bore with the distal end 6 in the lead.

In the fiber optic receptacle of the first embodiment, the stopper 2 is pressed to fit in the bore of the sleeve 1 so that not only the distal end face 11 which makes contact with the plug ferrule 15 but also the rear end face 5 are located inside of the end face 6 of the sleeve 1, and the inner diameter of the portion (contact area) to which the circumference of the stopper 2 makes contact is larger than the inner diameter of a no-contact area other than the contact area.

In the fiber optic receptacle of the first embodiment having the constitution described above, the stopper 2 is pressed to fit in the bore of the sleeve 1 by pressing the stopper 2 having outer diameter larger than the inner diameter of the sleeve 1 from the side of the distal end face 6 (one end) of the sleeve 1 in the lead, so as to hold the stopper 2 at a predetermined position within the bore. As a result, the sleeve 1 undergoes elastic deformation such that the inner diameter of the contact area 40 to which the circumference of the stopper 2 makes contact becomes substantially equal to the outer diameter D1 of the stopper 2, and the inner diameter of the no-contact area is smaller than the inner diameter of the contact area which makes contact with the circumference of the stopper 2.

Also, according to the first embodiment, the holder 3 having the sleeve receiving bore is also provided while the sleeve 1 is pressed to fit in the sleeve receiving border will the end face 6 in the lead, so that diameter of a first bore 41 which is a portion of the bore 4 on the side of one end face 6 further decreases.

Specifically, the end face 6 of the sleeve 1 is located in the sleeve receiving bore of the holder, and the length of the portion of the sleeve 1 which is inserted in the sleeve receiving bore is made shorter than the distance between the distal end face 11 of the stopper 2 and the end face 6 of the sleeve 1. Accordingly, the first bore 41 on the side of the one end 6 is compressed by the holder, so that the diameter of the first bore 41 further decreases (FIG. 1B).

The sleeve holder 3 is made of a material which can be easily welded such as SUS metal.

According to the first embodiment, since the first bore 41 is compressed by the holder to decrease the diameter thereof further, the force to retain the stopper 2 (retaining force exerted in the direction in which the load of inserting the plug ferrule is applied) can be increased. The force applied by the plug ferrule to the stopper when the plug ferrule 15 is pressed against the stopper 2 is about 1 kgf or less. When it is taken into consideration that the stopper receives an impact when the plug ferrule hits the stopper, it is effective to have the sleeve deformed in the direction in which the stopper is less likely to come off, for improving the retaining force.

On the side of the distal end of the stopper 2, since the sleeve 1 is not compressed by the holder 3, the second bore 42 of the sleeve 1 is suppressed from deforming so that the accuracy of inner diameter in the stage of manufacturing is maintained. Moreover, in addition to the fact that the sleeve 1 is not compressed by the holder 3 on the distal end side off the stopper 2, the stopper to hollow tubular shape is pressed to fit in the bore of the sleeve As a result, the inner diameter of the sleeve can be suppressed from decreasing on the side thereof at which the plug ferrule 15 corresponding to the optical connector is inserted.

In the first embodiment, as described above, the end face 5 of the stopper 2 is fixed at a position which is recessed from the end face 6 of the sleeve 1 so as to form the first bore 41, and the sleeve 1 is pressed to fit in the sleeve receiving bore of the holder thereby to deform the first bore 41 and increase the strength of retaining the stopper 2. In order to effectively increase the retaining strength, it is preferable that the rear end face 5 of the stopper 2 is recessed by 0.2 mm or more from the end face 6 of the sleeve. Distance X between the end face 6 of the sleeve 1 and the rear end face 5 of the stopper 2 is preferably 0.2 mm or more.

In the fiber optic receptacle of the first embodiment, since the inner space of the sleeve 1 is deformed by pressing the stopper 2 to fit therein, tapered portions are formed in the non-contact areas on both sides of the contact area 40, where the inner diameter gradually decreases with the distance from the contact area 40.

Specifically, the first bore 41 consists of the tapered portion 41b where the inner diameter gradually decreases with the distance from the contact area 40 and a first fixed-diameter portion 41a where the inner diameter remains substantially constant, and the second bore 42 consists of q tapered portion 42b where the inner diameter gradually decreases with the distance from the contact area 40 and a second fixed-diameter portion 42a where the inner diameter remains substantially constant. As will be clearly seen from FIG. 1B, the first fixed-diameter portion 41a is connected to the tapered portion 41b at the point thereof where the diameter in smallest and has the same diameters as the smallest diameter of the tapered portion 41b, while the second fixed-diameter portion 42a is connected to the tapered portion 42b at the point thereof where the diameter is smallest and has the same diameter as the smallest diameter of the tapered portion 42b.

Also according to the first embodiment, as described above, since only the first bore 41 located on the side of the end face 6 is compressed by the holder, diameter to the first fixed-diameter portion 41a is smaller than the inner diameter at the time before the stopper 2 was inserted, while diameter of the second fixed-diameter portion 42a is maintained substantially equal to the inner diameter at the time before the stopper 2 was inserted.

That is, the inner diameter of the bore 4 on the side where the plug ferrule 15 of the sleeve 1 is inserted (the second fixed-diameter portion 42a) does not become smaller than the inner diameter D2 at the time before the stopper 2 was pressed to fit therein by preening the sleeve 1 into the sleeve holder 3. Therefore in the first embodiment, the plug ferrule 15 can be inserted into the sleeve 1 without reprocessing the sleeve 1 to increase the inner diameter after pressing the sleeve 1 to fit in the sleeve holder 3.

When the deformation of the second bore 42 is suppressed to a relatively small level, the plug ferrule 15 (of the optical connector) which is inserted can be held over a long distance and tho plug ferrule can be suppressed from tilting. Thus it is made possible to decrease the loss caused by connection of the connector and decrease the variation thereof.

When the inner diameter varying region (the second tapered portion 42b) of the sleeve 1 on the side where the plug ferrule 15 is inserted is large, the second tapered portion 42b may be disabling when lateral load is applied to the plug ferrule since the plug ferrule 15 is not held in the second tapered portion 42b. Such a disaligment may cause the light emitted from the optical fiber to be reflected on the end face of the stopper 2.

Therefore, according to the present invention, length of the second tapered portion 42b is preferably small. Specifically, length of the second tapered portion 42b is preferably within 0.5 mm from the end face of the stopper.

According to the first embodiment, as described above, the fitting portion 8 of the sleeve 1 which is press-inserted into the sleeve holder 3 is positioned so as to cover the portion of the sleeve 1 where it is desired to change the inner diameter, thereby causing the stopper 2 to undergo elastic deformation so that only the diameter of the first bore 41 is decreased.

Also, according to the first embodiment, while diameter of the no-contact area (the first bore 41 and the second bore 42) is made smaller than the diameter of the contact area 40 where the circumference of the stopper 2 makes contact with, it is preferable that the diameter of the first bore 41 on one end side of the sleeve 1 is smaller than the outer diameter of the stopper 2 by 0.5 µm or more.

Outer diameter D1 of the stopper 2 before press-insertion of the stopper 2 into the sleeve 1 is made larger than the diameter D2 of the bore of the sleeve 1 before inserting the stopper 2 by 0.5 µm or more.

In case the outer diameter D1 of the stopper 2 before the press-insertion of the stopper 2 is made larger than the inner diameter D2 of the sleeve 1 before insertion by 0.5 µm or more, the second bore 42 of the side where the plug ferrule 15 is inserted can be suppressed from deforming with decreasing inner diameter of the second bore 42 when the sleeve 1 is pressed to fit in the sleeve holder 3.

When the outer diameter D1 before press insertion of the stopper 2 into the sleeve 1 is made larger than the inner diameter D2 of the sleeve 1 before the press insertion of the stopper 2 by 5.5 µm or more, the force required in the press insertion of the stopper 2 becomes higher and it becomes difficult to insert the stopper 2.

The outer diameter D1 before the press insertion of the stopper 2 into the sleeve 1 is therefore preferably set in a range from 0.5 to 5.5 mm.

In the fiber optic receptacle of the first embodiment, as described above, by pressing the stopper 2 to fit in the bore 4 of the sleeve 1 so as to deform the bore 4, and pressing the sleeve 1 to fit in the holder 3 so as to cause the first bore 41 of the bore 4 to shrink, the stopper 2 is fixed in the bore 4 of the sleeve 1 without using an adhesive. After the stopper 2 has been inserted into the sleeve 1, the difference between the inner diameter of the sleeve 1 in the contact area between the stopper 2 and the sleeve 1 and the second fixed-diameter portion 42a of the sleeve 1 is in a range from 0.1 to 2.0 µm. This is because the inner diameter of the sleeve 1 increases as the stopper 2 is pressed to fit therein, and the outer diameter of the stopper 2 is decreased by the press insertion. After the stopper 2 has been inserted into the sleeve 1, the difference between the outer diameter of the sleeve 1 in a portion corresponding to the contact area between the stopper 2 and the sleeve 1 and the outer diameter to the sleeve 1 in a portion corresponding to the no-contact area is also in a range from 0.1 to 2.0 µm.

Also, according to the first embodiment, the length of the portion of the sleeve 1 which is inserted in the sleeve receiving bore is made shorter than the distance between the distal end face 11 of the stopper 2 and the end face 6 of the sleeve 1, while the distal end face 11 of the stopper 2 protrudes toward the sleeve 1 and the other end face 19 of the sleeve holder. With this constitution, diameter of the bore 4 or the sleeve 1 in which the plug ferrule 15 is inserted is prevented from becoming smaller than the outer diameter D1, at the time before inserting the stopper 2, when the sleeve 1 is pressed to fit in the sleeve holder 3.

When assembling the fiber optic receptacle, first the stopper 2 is pressed to fit in the bore 4 of the sleeve 1, with a force of 100 N or more. The stopper 2 may be positioned in the axial direction of the sleeve 1 by, for example, using a dry ferrule having the same size with the plug ferrule 15. Specifically the dummy ferrule is inserted on the same side of the sleeve 1 as the plug ferrule 15 is to be inserted. Then position of the stopper 2 is determined at the position of the distal end face of the dummy ferrule. Thus the stopper 2 is pressed to enter from the end of the sleeve 1 until the distal end of the stopper 2 makes contact with the distal end of the dummy ferrule, and can be inserted to the predetermined position. The stopper 2 is positioned in place as the dummy ferrule is removed from the sleeve 1. The fiber optic receptacle is completed when the sleeve 1 having the stopper 2 pressed to fit therein is pressed into the sleeve holder 3.

In the fiber optic receptacle of the first embodiment described above, the stopper 2 can be pressed to fit in the sleeve 1 before assembling the sleeve 1 into the sleeve holder 3, thus making it possible to increase the degree of freedom in the design of the receptacle assembling process.

In the fiber optic receptacle of the first embodiment, the sleeve receiving bore of the sleeve holder 3 is formed in a 2-step structure having a portion of small diameter and a portion of larger diameter, so that the press-fit portion of the sleeve is pressed to fit in the portion of small diameter and the portion of the sleeve 1 in which the stopper 2 is inserted is covered as a whole by the portion of larger diameter. However, the present invention is not limited to this constitution, and it is not necessary to cover the entire stopper 2 which is fixed in the sleeve 1.

According to the present invention, the stopper 2 and the sleeve 1 are preferably formed from ceramics.

In case the stopper 2 and the sleeve 1 are formed from ceramics, all members to which the plug ferrule of the optical connector are made of ceramics, which does not generate metallic wear dust as in the case of forming the members from metallic material, so that the connector can be inserted very smoothly and stable accuracy of the stopper position can be maintained after repetitive connection and disconnection of the connector.

Forming the sleeve from ceramics which is an insulating material also makes it possible to prevent electric current caused by static electricity from flowing into the optical component.

The stopper 2 and the sleeve 1 formed from ceramics can be manufactured as follows. First, a raw material powder mixed with a resin binder and other material is formed into a green compact having a through hole by injection molding, press molding, extrusion molding or the like, and the green compact is sintered at a high temperature. The stopper is ground or polished on the circumference after sintering, and the total length is adjusted by grinding.

Figure 3:
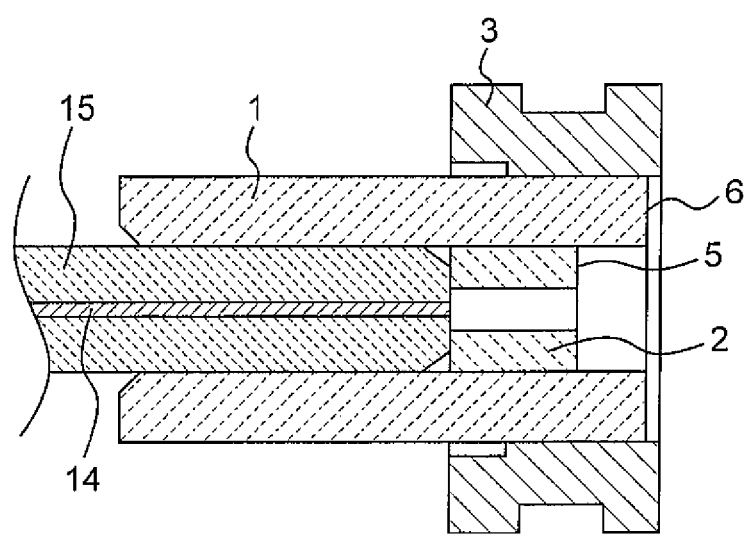
FIG. 3 is a sectional view showing the state of inserting a plug ferrule in the fiber optic receptacle according to the first embodiment of the present invention.

FIG. 3 shows the fiber optic receptacle of the first embodiment in a state of the plug ferrule 15 which holds the optical fiber on the optical connector side is inserted into the sleeve 1.

It is preferable that the diameter of the through hole of the stopper 2 is larger than the diameter of the through hole of the plug ferrule, which makes it possible to reduce the reflection of light on the distal end face 11 of the stopper 2.

In case the diameter of the through hole of the stopper 2 is smaller than the diameter of the through hole of the plug ferrule 15, it becomes more probable that light emerging from the optical fiber 14 is reflected on the distal end face of the stopper 2 when the optical fiber 14 held by the plug ferrule 15 is optically coupled to the through hole of the stopper 2. To prevent the reflection, it is preferable that the diameter of the through hole of the stopper 2 is larger than the diameter of the through hole of the plug ferrule 15. As for the upper limit, it is preferable that the diameter of the through hole of the stopper 2 is not larger than 5 times the diameter of the through hole of the plug ferrule 15, since the present invention has the constitution where the stopper is fitted by pressing.

In case an ordinary optical communication fiber is used, diameter of the through hole of the plug ferrule 15 is 125 μm and therefore diameter of the through hole of the stopper 2 is preferably larger than 125 μm and not larger than 650 μm.

Second Embodiment

An optical module 100 of the second embodiment of the present invention will now be described.

Figure 4:
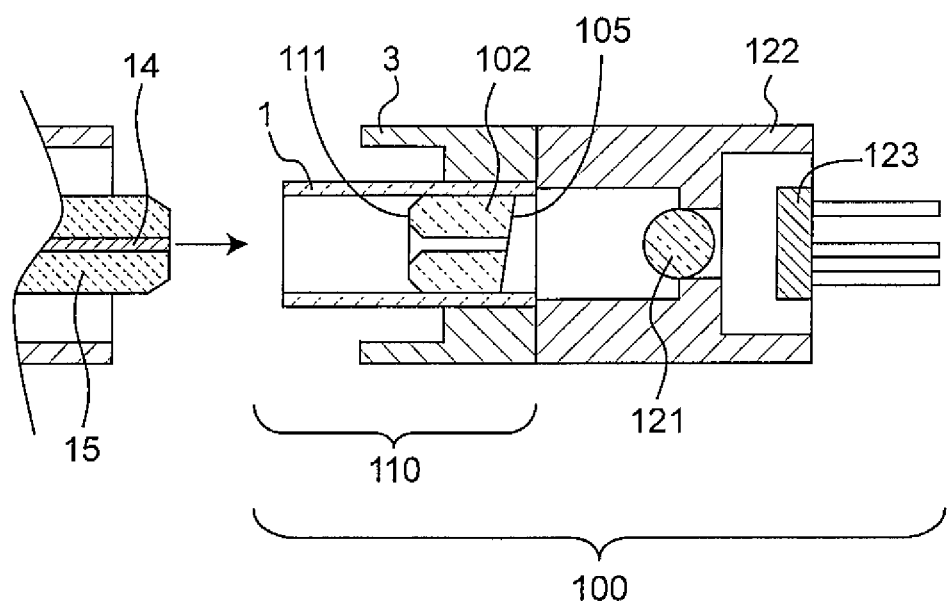
FIG. 4 is a sectional view showing an optical module according to a second embodiment of the present invention.

The optical module 100 of the second embodiment comprises a fiber optic receptacle 110 of the present invention, a lens 121, an optical device 123, and a casing 122 which holds the lens 121 and the optical device 123 disposed at predetermined positions and is connected to the fiber optic receptacle, as shown in FIG. 4.

In the optical module 100 of the second embodiment, the fiber optic receptacle 110 is constituted similarly to the fiber optic receptacle of the first embodiment except for the shape of the stopper 102 which is different from that of the stopper 2 of the first embodiment.

Specifically, the second embodiment is different from the stopper 2 of the first embodiment in that the rear end face 105 of the stopper 102 is tilted with respect to the center axis of the through hole (the center axis of the through hole does not perpendicularly cross the rear end face 105), and formation of R surface or C surface on the edge of the bore at the distal end face and the outer edge of the distal end face, although the constitution is similar to the stopper 2 of the first embodiment with other respects.

As the outer edge of the distal end face is formed in R surface or C surface, the stopper 102 can be pressed to fit in the bore of the sleeve 1 more easily than the stopper 2. In order to effectively prevent chipping or peel-off of the ceramics from occurring when press-inserting the stopper 102, the outer edge is preferably chamfered, either C surface or a surface, in a range front 0.03 to 0.15 mm, more preferably about 0.05 mm.

In the second embodiment, since the edge of the bore at the distal end face is formed in R surface or C surface, the edge of the bore at the distal end face can be prevented from being chipped or cracked when the plug ferrule 15 is put into contact with the distal end face of the stopper. In order to effectively prevent chipping and cracking, the edge of the bore is preferably chamfered, either in C surface or R surface, in a range from 0.02 to 0.15 mm, more preferably about 0.05 mm.

As for the distal end face 11 of the stopper 2 with which the plug ferrule 15 is put into contact, the edge of the ceramics is formed into C surface or R surface by polishing by means of, for example, diamond slurry.

As for the sleeve 1, the outer circumference is ground or polished after processing the inner circumference by polishing with high precision. Then the total length is adjusted by grinding, with the end face finished by grinding the hole in which the plug ferrule 15 is inserted and forming R surface on the edge by polishing with diamond slurry. This is similar to the first embodiment.

In the optical module 100 of the second embodiment, the casing 122 having the lens 121 and the optical device 123 housed therein is connected to the holder 3 of the fiber optic receptacle, and the optical device 123 is optically coupled via the lens 121 with the through hole in the stopper 102 of the fiber optic receptacle.

The optical device 123 may be a light emitting device or a light receiving device. In case the optical device 123 is a light emitting device, an optical module for transmission is made where light emerging from the light emitting device enters the lens 121 so as to be focused in the through hole of the stopper 102 and is optically coupled with an optical fiber 14 which is held by the plug ferrule 15. In case the optical device 123 is a light receiving device, an optical module for reception is made where light emerging from the optical fiber 14 propagates in the through hole of the stopper 2 and is optically coupled via the lens 121 with the light receiving device.

The light emitting device may be, for example, DFB laser element, Fabry-Perot type laser element or surface emitting laser element. The Fabry-Perot type laser element and the surface emitting laser element, in particular, are less affected by the reflection which returns to the laser element, and are therefore less likely to generate noise originating in the reflection. That is, in case the Fabry-Perot type laser element or the surface emitting laser element is used as the light emitting device in the optical module of the second embodiment, influence of reflection on the interface with the optical fiber held in the plug ferrule 15 can be reduced. In such an optical module, it is not necessary to provide an optical fiber or the like for matching the refractive index with the optical fiber held in the plug ferrule 15 in the through hole in the stopper 2 of the fiber optic receptacle 110, thus allowing the optical module to be constituted from a smaller number of components and preferably used in short distance transmission.

Third Embodiment

Figure 5A:
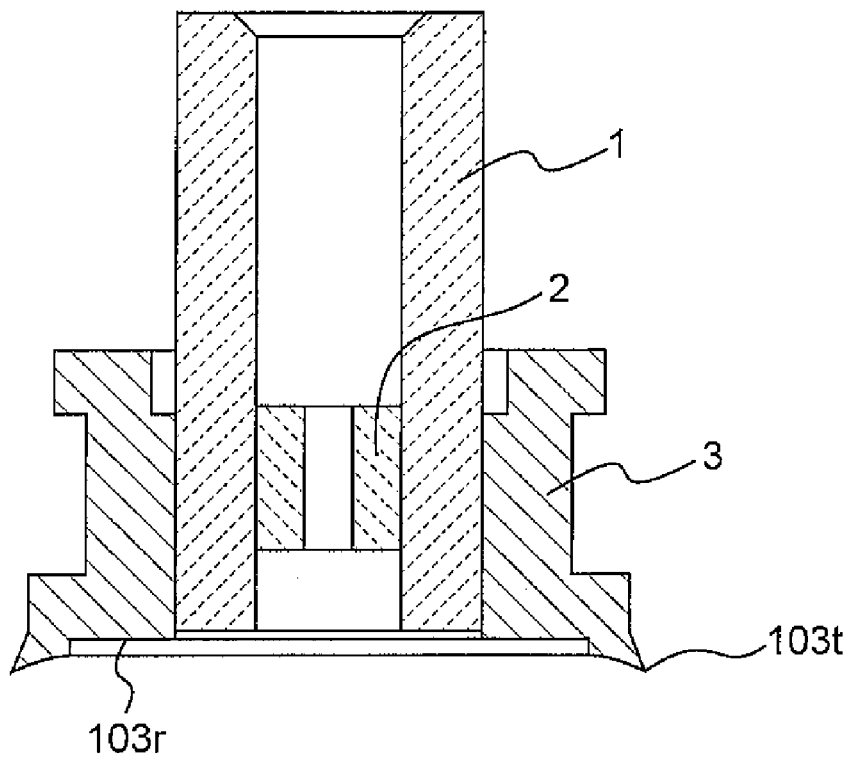
FIG. 5A and FIG. 5B are sectional views showing a fiber optic receptacle according to a third embodiment of the present invention.
Figure 5B:
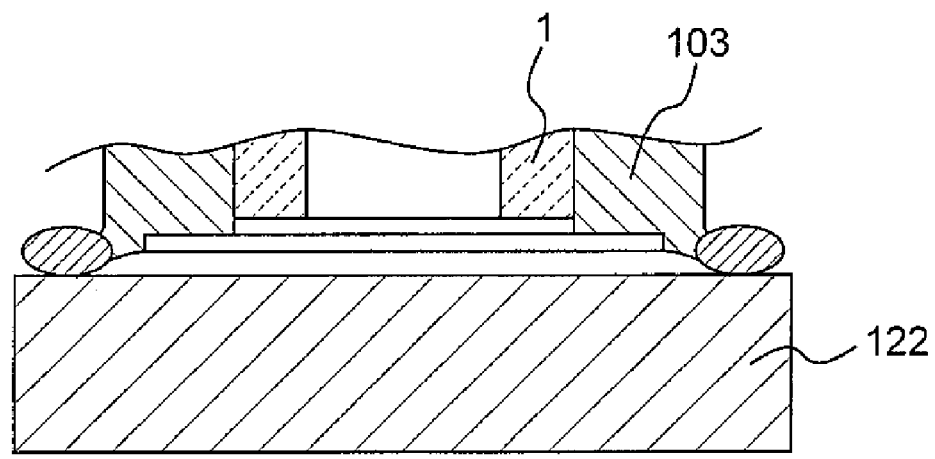

FIG. 5 is a sectional view showing a part of the optical module according to the third embodiment of the present invention.

The optical module of the third embodiment has a constitution similar to that of the second embodiment, except for the holder 103 of which structure is different from that of the holder 3 to the first embodiment.

That is, the holder 3 of the second embodiment has a flat surface on one end so as to make planar contact with the junction surface of the casing when joined with the casing in which the optical device is disposed, the holder 103 of the optical module of the third embodiment is joined (welded) with the casing through linear contact.

Specifically, according to the third embodiment, the holder 103 has a recess 103r formed with a diameter larger than that of the sleeve receiving bore on one end which joins with the casing 122, with the surface between the edge of the recess 103r and the outer edge being inclined so that only the outer edge makes contact with the casing. Thus as the holder 103 of the third embodiment makes linear contact with the casing on one end face thereof, the fiber optic receptacle can be prevented from tilting when welded onto the casing, and enabling welding onto the casing with high precision.

In case the holder has a flat surface on one end so as to make planar contact with the casing, the receptacle may tilt when welded with low accuracy of the welded surface.

In other words, making planar contact of one end face of the holder with the casing requires the surfaces to be welded (particularly the surface of the casing to which the end face is welded) to have higher surface accuracy. However, in case the contact is made linearly as in the fourth embodiment, influence of the surface accuracy can be reduced. That is, the accuracy of securing the receptacle becomes less susceptible to the influence of surface accuracy of the casing to which the end-face is welded.

Variation

In the fiber optic receptacle of the first embodiment and the fiber optic receptacle of the second and third embodiments, the stopper 2 has simple structure wish the through hole thereof left empty. However, the present invention is not limited to this constitutions and the through hole of the stopper 2 may be filled a translucent material. Refractive index of the translucent material may be either uniform or graded so as to decrease gradually from the center toward the periphery.

In this case, reflection on the interface can be reduced by filling the through hole with a translucent material having refractive index comparable to that of the optical fiber (from 1.35 to 1.45) and putting the distal end of the optical fiber which is held by the plug ferrule 15 into close contact with the translucent material.

While there is no limitation on the translucent material, acrylic resin, epoxy resin or the like may be used.

Examples of the present invention and Comparative Examples will now be described.

EXAMPLE 1

The fiber optic receptacle according to the first embodiment of the present invention shown in FIG. 1 was made as Example 1.

While the sleeve 1 may be formed from such materials as metal, plastics or ceramics, the sleeve 1 of Example 1 was made from zirconia ceramics which allows for high accuracy of inner diameter and has high wear resistance. While the fiber optic receptacle is usually made with inner diameter of about 1.25 mm or about 2.5 mm, inner diameter of 1.25 mm typically used in low-speed optical modules was employed in Example 1.

The sleeve 1 was made as follows. First, a green compact having a through hole was made by extrusion molding, and was fired at a high temperature. The inner circumference was polished with dimensional tolerance of 1.25 mm+0.001 mm/−0 mm for the inner diameter.

The inner circumference was finished to obtain surface roughness Ra of 0.2 μm or less in order to reduce the friction and achieve smoother insertion of the plug ferrule. Then the outer circumference was ground to obtain the predetermined diameter, and the predetermined length was also obtained by grinding. Then a cone-shaped portion 16 was formed on the inserting side of the plug ferrule 15 by a diamond tool. Last, in order to prevent chipping of ceramics, the edge of the sleeve 1 was polished by using diamond slurry on both ends thereof.

The manufacturing process for the stopper 2 will now be described. The stopper 2 was formed from zirconia ceramics similarly to the sleeve 1. By forming from the same material, thermal expansion coefficients of these members can be made identical, thus achieving stability in the retaining strength and in stress. Extrusion molding process was employed similarly to the sleeve 1, so as to make the green compact having the through hole that was fired at a high temperature.

Then the outer circumference was ground and polished to obtain the predetermined outer diameter. The outer diameter was set to the inner diameter of the sleeve 1 plus 0.5 μm or more, for the purpose of press-fitting in the bore of the sleeve 1.

The predetermined length was obtained by grinding, and the edge was polished into R surface by using diamond slurry on the end on the side where the plug ferrule 15 was to make contact with.

Then after pressing the stopper 2 to fit in the sleeve if the sleeve 1 was pressed to fit in the sleeve holder 3. At this time, the fitting section 8 of the sleeve holder 3 was adjusted so that the end face 11 of the stopper 2 extruded by about 1 mm from the sleeve holder 3 and the fitting section 8 of the sleeve 1.

Figure 2:
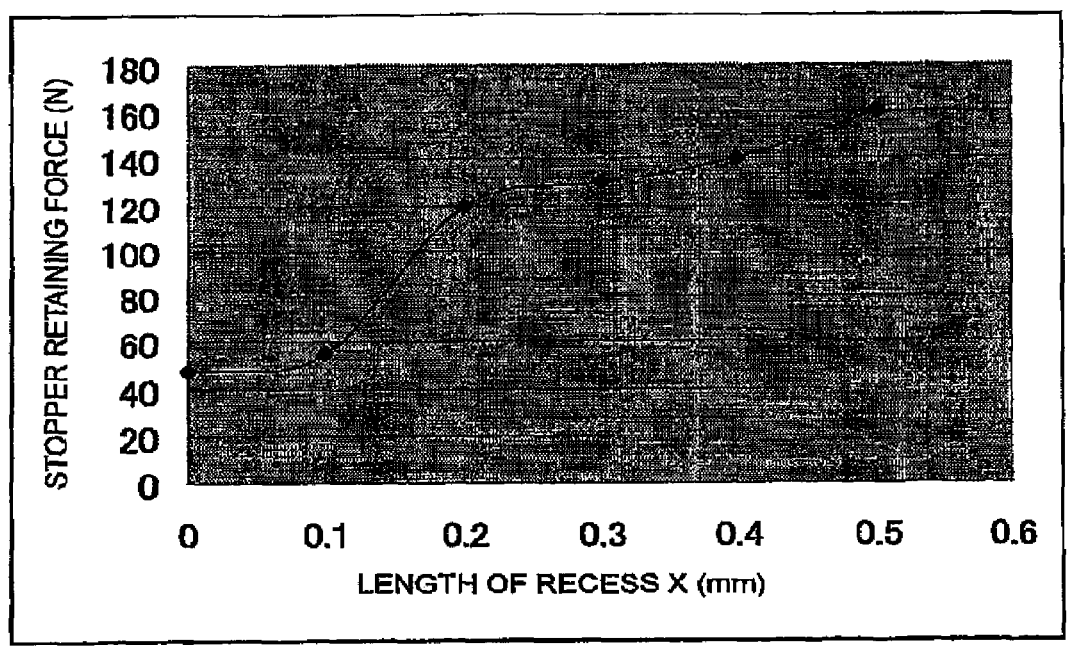
FIG. 2 is a graph showing the relationship between the length of a recess and stopper retaining force.

The depth X of the recess from the end face 6 on one end of the sleeve 1 to the end face 5 of the stopper 2 was varied from 0 mm to 0.5 mm in stops of 0.1 mm, and the retaining force of the stopper 2 was measured. FIG. 2 shows the retaining force plotted along the abscissa against the depth size along the ordinate. In these samples, the sleeve 1 and the fitting section 8 of the sleeve holder 3 were provided so as to cover the portion of depth X. As a result, the bore 7 of depth X in the recess of the sleeve 1 underwent elastic deformation in the shrinking direction.

The result shown in FIG. 2 indicates that the retaining force of the stopper 2 sharply increased when the depth X of the recess exceeded 0.2 mm. This is due to the elastic deformation of the sleeve 1, and providing the recess stabilizes the retaining force of the stopper and enables it to provide the fiber optic receptacle having high reliability.

It was confirmed that the inner diameter was kept within 1.25 mm+0.001 mm/−0 mm after the fiber optic receptacle was assembled.

Figure 6:
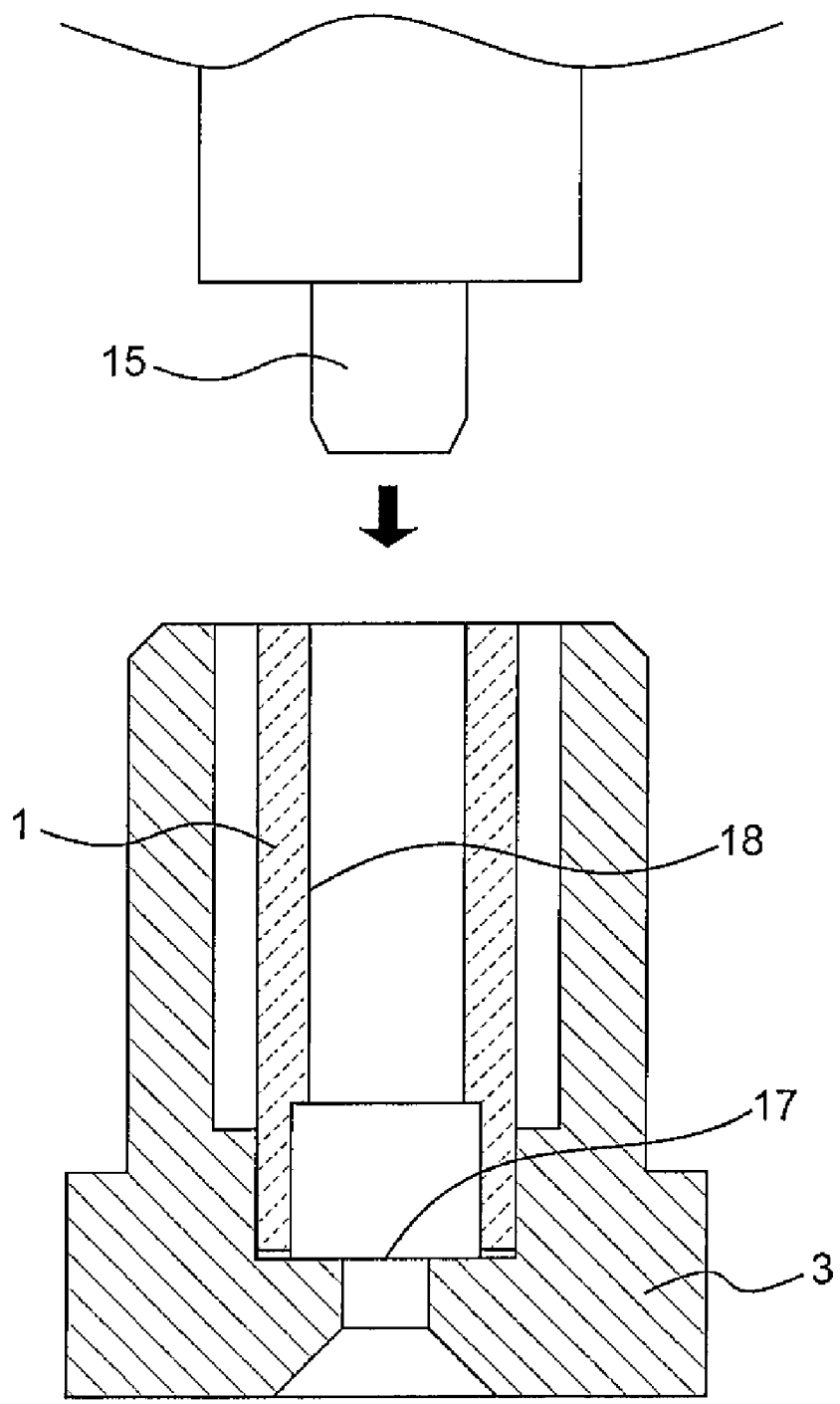
FIG. 6 is a sectional view of a fiber optic receptacle of the prior art.

Then the fiber optic receptacle of the prior art shown in FIG. 6 was made and subjected to measurements as described below.

An insertion test of the connector was carried out as follows. A standard LC connector available in the market was prepared. The fiber optic receptacle to be tested was attached to an adapter housing where the LC connector could be attached and detached, so that connect-disconnect test could be carried out similarly to the connection of ordinary LC connector and LC adapter. In the test, the LC connector was inserted into the fiber optic receptacle until the latch of the LC connector fully engaged with the adapter housing. Thrusting force of the insertion is determined by the pressure of a spring provided in the LC connector, and is about 4.9 N. Then the LC connector was disconnected from the adaptor housing. This operation was repeated 1000 times.

The inner diameter of the completed precision sleeve was measured by the gage test (go/no-go inspection). In the measurement of the end face position of the stopper, the height of the distal end face of the stopper (on the side where the connector was inserted) from the bottom surface of the sleeve holder was measured with a dial gage (manufactured by Mitutoyo Corporation). Straightness of the inner surface of the precision sleeve was measured by moving a probe of a straightness measuring instrument manufactured by Tokyo Seimitsu along the inner surface of the sleeve in the longitudinal direction. The results of measurements of the sample of the present invention and the sample of the prior art are compared in Table 1.

TABLE 1

| | Product of Present invention (FIG. 1) | Product of Prior art (FIG. 6) |
|---|---|---|
| Connector insertion test | No change in insertion after 1000-cycle connect-disconnect test (No deposition of metal dust on the inner surface of sleeve) | Ease of insertion changed after 1000-cycle connect-disconnect test (2 out of 11 samples failed to insert during the test, metal dust deposited on the inner surface of sleeve) |
| Stopper position after 1000-cycle connect-disconnect test | Variation in end face position of the stopper was within 2 μm (measurement error included) | Variation in end face position of the stopper was within 15 μm (measurement error included) |
| Variation in inner diameter of precision sleeve in completed product | Within 1 μm range | Within 2 μm range |
| Accuracy of stopper end face position | Target dimension ±5 μm | Target dimension ±15 μm |
| Straightness of inner surface of precision sleeve | Within 1 μm | about 2 μm |

As shown in Table 1, the samples of the present invention showed no change in the ease to insertion after 1000-cycle connect-disconnect test of the connector. Of the 11 samples of the prior art, two samples failed to insert in the course of the test. Observation of the inner circumference of the sleeve of the failing sample showed metal dust deposited thereof.

In the measurement of variation in the stopper position after 1000-cycle connect-disconnect test, samples of the prior art showed changes of up to 15 μm after the test. Observation of the stopper surface 17 after the test showed wear and deformation of metal fixture caused by contact of the plug ferrule when connecting and disconnecting the connector.

The samples of the present invention, in contrast, showed no substantial wear after 1000-cycle connect-disconnect test with variation of about 2 μm at the maximum, since the stopper 2 was made of ceramics.

Then the inner diameter of the sleeve 1 was measured in the completed fiber optic receptacle. The samples of the prior art showed variations in the inner diameter of about 2 μm. The samples of the present invention showed variations in the inner diameter to about 1 μm.

While the samples of both groups used the sleeves 1 having the same inner diameter before being press-inserted into the sleeve holder 3, there was a difference in the variation of inner diameter of the sleeve 1 after being press-inserted into the sleeve holder 3. This is supposedly because the samples of the prior art were not made in such a structure that suppresses the before of the sleeve 1 from deforming due to being pressed into the sleeve holder 3. As a result, it is presumed, variation in the inner diameter of the portion of the sleeve holder 3 in which the sleeve 1 was inserted and the outer diameter of the portion of the sleeve holder 3 in which the sleeve 1 was inserted caused the stress of the sleeve 1 to change.

In the case of the samples of the present invention, when the sleeve 1 is pressed to fit in the sleeve holder 3, the stopper 2 which is fixed in the inner space of the sleeve 1 suppresses the sleeve 1 from changing in the inner diameter. As a result, inner diameter of the sleeve 1 does not decrease and stable dimensional accuracy can be maintained. In fact, measurement of straightness of the inner surface of the sleeve 1 showed about 2 μm in the samples of the prior art and about 1 μm in the samples of the present invention.

Accuracy of the stopper position in the fiber optic receptacle of the prior art depends on the accuracy of machining the sleeve holder and is limited to about ±15 μm. It was verified that, according to the present invention, the positioning accuracy of the stopper 2 can be controlled to about ±5 μm by using an assembly fixture having high accuracy.

From the results of comparison described above, it can be seen that the constitution of the present invention makes it possible to provide the fiber optic receptacle having high mechanical stability and high precision.

What is claimed is:

1. A fiber optic receptacle to be connected to an optical fiber held by a ferrule, comprising:
    a tubular shaped sleeve comprising an inner bore into which the ferrule is to be inserted;
    a stopper member comprising a distal end face to be contacted to one end of the ferrule, a rear end face and a through hole penetrating from the distal end face to the rear end face, the stopper member being disposed in the inner bore of the tubular shaped sleeve so that the distal end face and the rear end face of the stopper member are positioned in the inner bore apart from both ends of the inner bore;
    wherein the inner bore of the tubular shaped sleeve has a contact area contacting with a circumference of the stopper member and non-contact area not contacting with a circumference of the stopper member, the non-contact area being disposed on both sides of the contact area, and wherein a diameter of the inner bore in the contact area is larger than a diameter of the inner bore in the non-contact area.

2. The fiber optic receptacle according to claim 1,
    wherein the non-contact area has tapered portions on both sides of the contact area, each tapered portion having an inner diameter which gradually decreases with the distance from the contact area.

3. The fiber optic receptacle according to claim 2,
    wherein one of the tapered portions which is positioned on a side of the distal end face of the stopper member has a length less than 0.5 mm in an axis direction.

4. The fiber optic receptacle according to claim 1,
    wherein the through hole of the stopper member has an increasing diameter toward the distal end face of the stopper member.

5. The fiber optic receptacle according to claim 1,
    wherein the through hole of the stopper member is filled with a translucent material comprising resin or glass, the translucent material having a uniform refractive index.

6. The fiber optic receptacle according to claim 5,
    wherein the refractive index of the translucent material is in a range from 1.35 to 1.45.

7. The fiber optic receptacle according to claim 1,
    wherein the stopper member comprises ceramics.

8. The fiber optic receptacle according to claim 7,
    wherein the tubular shaped sleeve comprises a material same as the stopper member.

9. The fiber optic receptacle according to claim 1, further comprising:
    a holder comprising a sleeve receiving bore having a small diameter region contacting with the tubular shaped sleeve and a large diameter region not contacting with the tubular shaped sleeve, wherein one end face of the tubular shaped sleeve is in the small diameter region of the sleeve receiving bore of the holder, and wherein a length of a portion of the tubular shaped sleeve in which the portion is in the small diameter region of the holder is shorter than a distance between the distal end face of the stopper member and the one end face of the tubular shaped sleeve.

10. The fiber optic receptacle according to claim 1, wherein a diameter of the through hole of the stopper member is larger than a diameter of the through hole of the ferrule.

11. An optical module comprising:

a fiber optic receptacle to be connected to an optical fiber held by a ferrule, the fiber optic receptacle comprising:

a tubular shaped sleeve comprising an inner bore into which the ferrule is to be inserted, and a stopper member comprising a distal end face to be contacted to one end of the ferrule, a rear end face and a through hole penetrating from the distal end face to the rear end face, the stopper member being disposed in the inner bore of the tubular shaped sleeve so that the distal end face and the rear end face of the stopper member are positioned in the inner bore apart from both ends of the inner bore, wherein the inner bore of the tubular shaped sleeve has a contact area contacting with a circumference of the stopper member and non-contact area not contacting with a circumference of the stopper member, the non-contact area being disposed on both sides of the contact area, and wherein a diameter of the contact area is larger than a diameter of the non-contact area;

an optical device optically connected to the through hole of the stopper member; and a casing housing the optical device, the casing being connected to the fiber optic receptacle.

12. The optical module according to claim 11, wherein the optical device comprises a light emitting device which emits a light to the through hole of the stopper member.

13. The optical module according to claim 12, wherein the optical device comprises one selected from a group consisting of a Fabry-Perot type laser element and a surface emitting laser element.

14. The optical module according to claim 11, wherein the optical device comprises a light receiving element which receives a light transmitting in the through hole of the stopper member.

15. The optical module according to claim 11, wherein the fiber optic receptacle further comprises a holder comprising a sleeve receiving bore in which the tubular shaped sleeve is pressed to fit, and wherein the holder and the casing are joined to each other, wherein the joined portion has a linear shape.

* * * * *